United States Patent [19]

Baylor et al.

[11] Patent Number: 5,742,812

[45] Date of Patent: Apr. 21, 1998

[54] PARALLEL NETWORK COMMUNICATIONS PROTOCOL USING TOKEN PASSING

[75] Inventors: Sandra Johnson Baylor, Ossining; Peter Frank Corbett, Scarsdale, both of N.Y.; Dror Gershon Feitelson, Jerusalem, Israel

[73] Assignee: International Business Machines Corporation, Armonk, N.Y.

[21] Appl. No.: 520,346

[22] Filed: Aug. 28, 1995

[51] Int. Cl.⁶ .............................. G06F 13/00; G06F 13/14
[52] U.S. Cl. .................... 395/608; 395/602; 395/617; 395/730
[58] Field of Search ................................ 395/601, 608, 395/610, 617, 602, 728, 730

[56] References Cited

U.S. PATENT DOCUMENTS 5,434,994  7/1995  Shaheen et al. ...................... 395/617
5,452,445  9/1995  Hallmark et al. ..................... 395/602

OTHER PUBLICATIONS

P.F. Corbett et al. "The Vesta Parallel File System", IBM Computer Science Rpt. #RC18337, Sep. 16, 1992.
K. Salem et al. "Disk Striping", Proc. IEEE 1986 Conf. on Data Eng. pp. 336-342.
D. P. Reed, "Implementing Atomic Actions on Decentralized Data", ACM Trans. on Computer Systems, vol. 1, #1, Feb. 1983 pp. 3-23.

T. Haerder et al. "Principles of Transaction-Oriented Database Recovery", Computing Surveys, V. 15, #4, Dec. 1983, pp. 287-317.

M. Herlihy, "Concurrency versus Availability: Atomicity Mechanisms for Replicated Data", ACM Trans. on Computer Sys., V. 5, #3, 249-274.

*Primary Examiner*—Jack B. Harvey
*Assistant Examiner*—Jeffrey K. Seto
*Attorney, Agent, or Firm*—Robert P. Tassinari, Jr.; Douglas W. Cameron

[57] ABSTRACT

A protocol for achieving atomic multicast in a parallel or distributed computing environment. The protocol guarantees concurrency atomicity with a maximum of m-1 message passes among the m server nodes of the system. Under one embodiment of the protocol, an access component message is transferred to the server nodes storing data to be accessed. The first server node of the plurality generates a token to be passed among the accessed nodes. A node can not process its request until it receives the token. A node may pass the token immediately upon ensuring that it is the current expected token.

33 Claims, 3 Drawing Sheets 5,742,812

PARALLEL NETWORK COMMUNICATIONS PROTOCOL USING TOKEN PASSING

FIELD OF THE INVENTION

The invention relates to communication network protocols.

BACKGROUND OF THE INVENTION

There are many applications and subsystems in parallel or distributed computers that require atomic multicasting of messages. A multicast message is initiated (sent) by one node or processor of a parallel or distributed computer, and is sent to one or more other nodes of the parallel computer. The part of the multicast message sent to each node can be referred to as a component message. The contents of all component messages of a multicast message may be the same or may be different. Also, a generalization is that more than one component message of a multicast message can be sent to any node.

Atomic multicast is the property achieved when the component messages of a first message sent from one node to a set of other nodes is received at each of those nodes either entirely before or entirely after the component messages of a second multicast message sent by the same node or another node to the same set or an overlapping set of nodes are received.

In many parallel and distributed systems, the individual messages of a multicast may be required to be received in atomic order. However, the communication networks often can make no guarantee about the order in which the component messages of a multicast message are received. In this case, a possible solution is to use a protocol to "schedule" the order of the arrival of message components at each receiving node. The received message components may be reordered after their arrival at the receiving node by this scheduling protocol so that an overall atomic ordering of the multicast messages is achieved.

This invention describes a protocol which is efficient when a relatively large subset of a designated set of nodes will receive each multicast message, and where the multicast component messages contain a substantial amount of data, and possibly are different from the other component messages of the multicast message. In this case, it is efficient to send the message components directly to each receiving node, and to use a protocol employing smaller messages to schedule the "arrival" of the received message components at each node.

An application of this protocol occurs in parallel file systems. In a parallel file system, a set of client nodes interacts with a set of server nodes. Each request made by a client node should be serviced atomically by the server nodes with respect to all other requests made by the client nodes. This would be simple to ensure if individual requests were serviced by only one server node, with different requests being serviced by the same or other server nodes. However, in the general case, a file may be stored on several server nodes, and a request may access file data or metadata on more than one server node. These data and metadata accesses must be performed in an atomic order among all the file server nodes. This is known as concurrency atomicity. When two accesses affect the same data and both span multiple nodes, then at every node all components of one access must either precede or follow all components of the other access. In general, in a message passing computer or in a distributed computer system, the interconnection network connecting the various file server nodes to each other and to the requesting sites may not guarantee any absolute ordering of the access component messages received at each file server node. Therefore, a protocol is required to ensure consistent ordering of the access components at each file server node.

Much work has been done in the area of atomic accesses to data, particularly to databases. In databases, the concept of a transaction has been developed to cover two types of atomicity: concurrency atomicity, which is informally described above, and failure atomicity, which requires that the effects of composite accesses be either completely seen or not seen at all in the event of some failure. In the file system environment where the present invention is to be used, periodic file checkpoints are taken to protect against failures, so the atomicity mechanism is not required to account for failures by preserving failure atomicity. However, concurrency atomicity is required to ensure properly consistent access to file data distributed across multiple nodes. The mechanisms used to ensure atomic accesses in databases are often quite complex and require two phase commit protocols to be executed between the sites performing accesses and the multiple nodes serving those accesses. These protocols require some blocking of servers and serialization of client requests. The present invention presents an improved technique for achieving this objective with no blocking of the servers, and with no inter-client scheduling, and with high server throughput.

SUMMARY OF THE INVENTION

The present invention present a protocol, with several variations described, for guaranteeing atomic execution of access requests that span multiple file server nodes in a parallel file system. That is, the protocol ensures that an access appears as a single operation even though performed over a plurality of servers. That is, the protocol ensures that an access appears as a single operation, even though performed in separate components/steps. The protocol involves communication among the file server nodes to ensure atomicity, and require, for a given request, a number of messages between the file server nodes equal at most to the number of file server nodes.

With the protocol, a single request message is sent by the requesting site to each file server node that possesses data to be accessed.

With a variation of the protocol, a single request message is sent by the requesting site to only one of the plurality of nodes that possess the data to be accessed.

The two variations of the protocol can be used concurrently in a parallel computer.

Thus, one aspect of the invention is a method for achieving atomic multicasting in a computer having a plurality of system nodes, comprising: a first step of sending a first message from a first node to a first plurality of nodes that will receive the multicast message; a second step of in a logical first of the first plurality of nodes that receive the message: generating a token; delivering the first message to the application; and passing the token to a next system node; and a third step of in each node that is not the logical first of the first plurality of nodes that receive the message, delivering the first message to the application after such node has received the token, and if it is not the logical last of the first plurality of nodes, passing the token to a next system node.

FIGURES

DETAILED DESCRIPTION

Most of this description of the invention is in the context of its use to implement a parallel file system. However, those skilled in the art will recognize that the invention, in whole or in part, can be used to achieve atomic multicast in a variety of applications, including other systems where a set of clients interact with a parallel server. A possible application of this invention is in database systems, which have traditionally employed two-phase commit protocols to achieve atomic ordering of accesses.

This invention provides a mechanism to ensure an atomic ordering of (for example) parallel file system accesses and requests. It does so by providing a protocol for ordering (possibly reordering) the stream of request component messages received by each server node, where each request is divided into a set of access component request messages by the client.

To implement this invention, the set of server nodes is ordered once and for all time, usually from 0 to N−1, where N is the number of server nodes.

Figure 1:
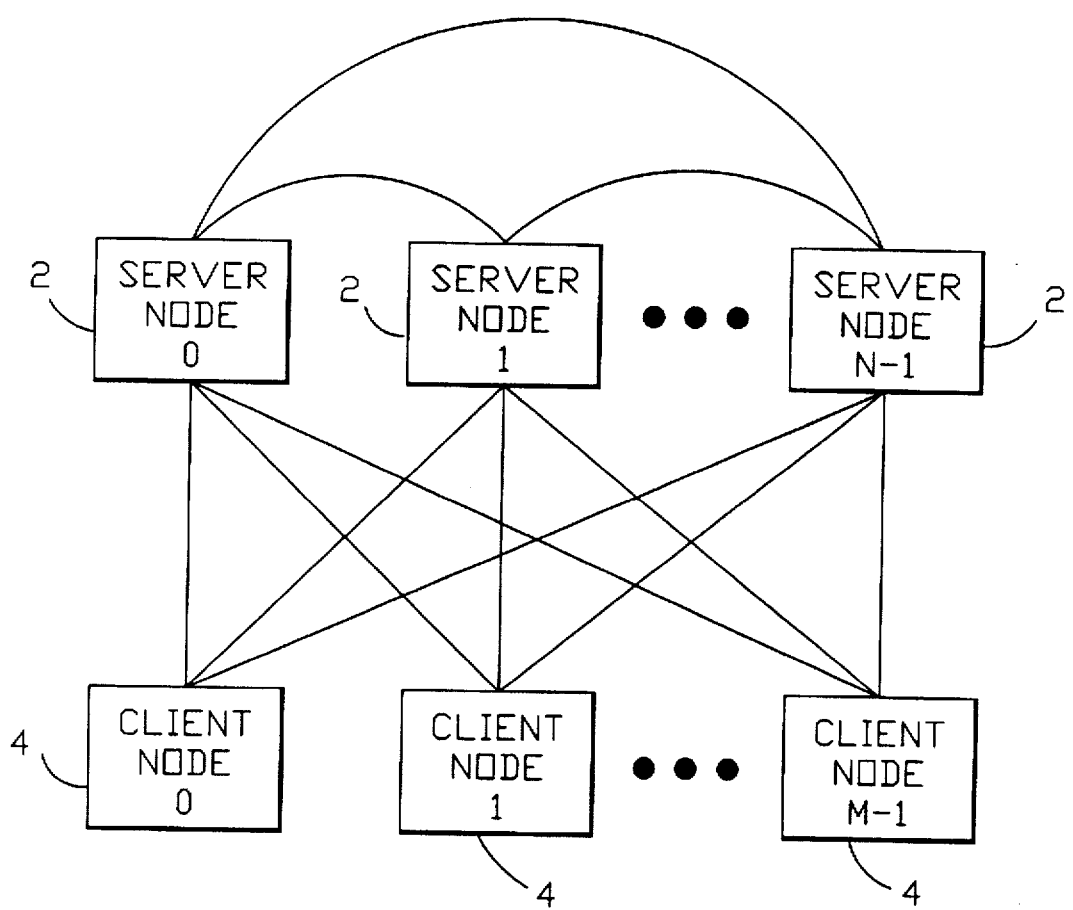
FIG. 1 is a block diagram of a system in which the method of the invention can be used.

In one embodiment of the invention, consider a file system that is implemented over multiple file server nodes 2, such as in the system of FIG. 1. In the embodiment shown, the system has N server nodes, numbered 0 to N−1. The data of individual files can be spread over any or all of the nodes. Individual accesses to the data, such as reads or writes, by one or more of the m clients 4 can require access to data at any or all of the nodes that contain the file. When multiple accesses, possibly originating from multiple distinct requesting sites (client nodes), are being processed by the parallel file system, it is essential that all components of any two accesses that affect the same data are performed in the same sequence at each node containing part of the data. For example, if one client requestor reads an entire file that is stored on several different server nodes, and another requestor writes the same entire file, then either all the components of the read access should be performed before the write access components, or all the write access components should be performed before the read access components. It is clear that the same problem arises when the data to be accessed only partially overlap, in which case the overlapping data must be read/written in a consistent order.

The present invention solves this problem of ensuring concurrency atomicity. It accomplishes this using a protocol that requires as few as n−1 and never more than N−1 messages to be passed among the n file server nodes that are serving a particular request in a computer with N file server nodes.

In one embodiment of the invention, the only interaction required between the file server nodes and the requesting sites is for the transmission of an access component message by the requesting site to each file server node containing part of the requested data. Therefore, the protocol is very efficient and executes with very little impact on performance.

In an alternative embodiment of the invention, the requesting site will send an access message to only one server node. The server node, in turn, will relay a message containing request information among the file server nodes.

Figure 4:
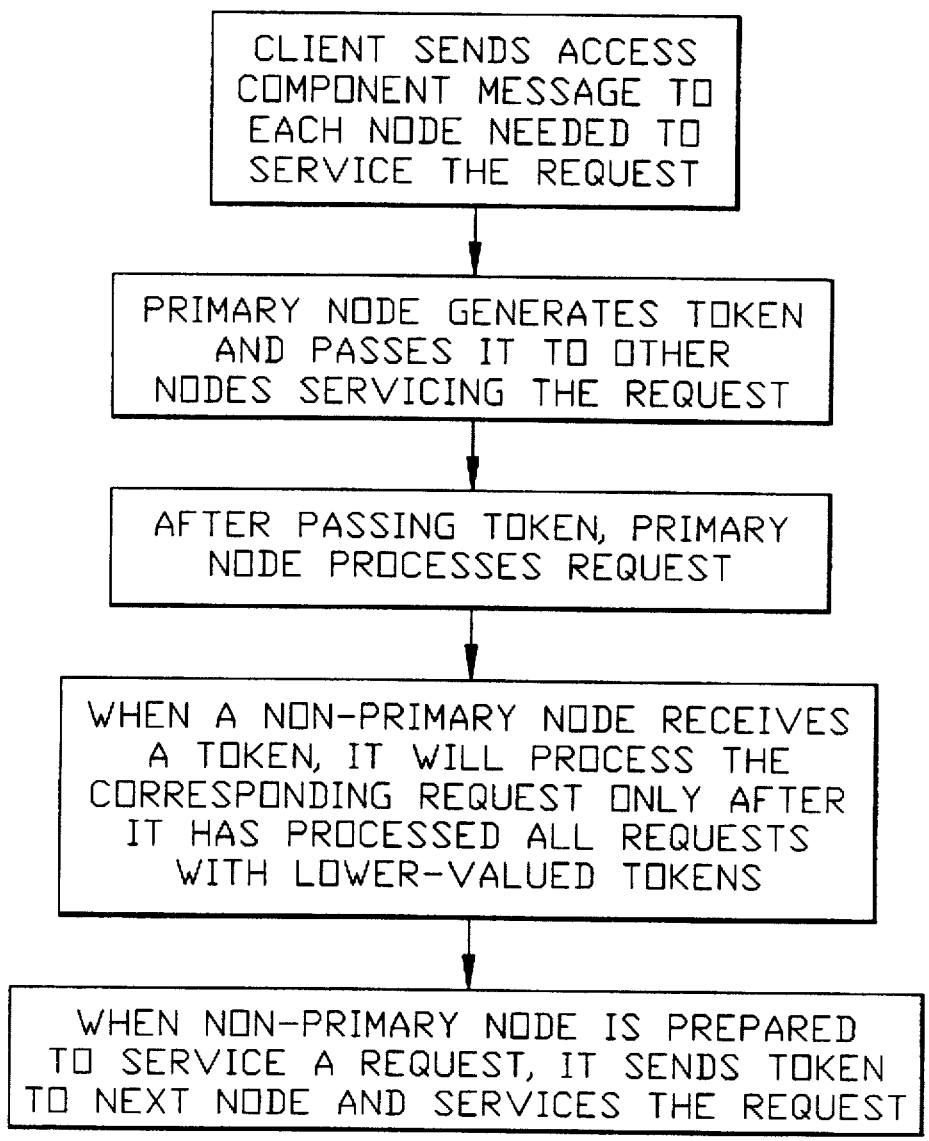
FIG. 4 is a flow diagram describing steps of the method of one embodiment of the invention.

The invention will now be described in detail with respect to an array of file server nodes numbered from 0 to N−1, as shown in FIG. 1. FIG. 4 is a flow diagram describing generally the steps of this embodiment. Each file is distributed across some subset, or all, of these nodes. Individual accesses need not necessarily span a contiguous range of file server nodes. Accesses to different files can be processed independently of each other, with no concern for ordering of the access component messages at each server node. However, accesses made to the same file may conflict with each other by requesting access to the same data elements, and therefore some way of ensuring consistency atomicity is required. The consistency protocols presented here can be applied at the file level, or can be applied among all accesses to all files with no difference in the number of messages sent. This can be accomplished simply by ordering all requests, regardless of file. This choice is an implementation question only.

An access component message will now be described in detail with reference to the flow diagram of FIG. 1. In this implementation of the invention, each access is divided by the requesting site into access component messages such that each server node will receive 0 or more messages completely describing the component of the access to be performed by that server node. Only those server nodes containing part of the requested data will be sent an access component message. One of the access component messages is specially marked (by means of setting flag 100) as the primary access component, and is sent to only one of nodes. The node selected will typically but not necessarily be the node that services the lowest addressed portion of the request. The access component message sent to one other node is marked (by means of setting bit 102) the ultimate access component. In accordance with the invention, if the primary access component is sent to node p, then the ultimate access component will be sent to the one node u such that no access component message is sent to any node outside the range p<=n<=u when p<u or to any node inside the range u<n<p when p>u.

Each access component message of each compound access is distinguished from access component messages of other compound accesses by an access identifier 104. The access identifier comprises a unique identifier 104 identifying the requestor (e.g., requesting client node), and an access sequence number 106 indicating the sequential number of the access among a plurality of access requests issued by that requestor. This access identifier is sent in each access component message. The access component message for each server node also includes, in one embodiment of the invention, the number of the next (modulo N) file server node that will receive an access component message as part of this access. Alternatively, a bit map indicating all file server nodes receiving access component messages can be included with each access component message. Such a bit map will have a bit location corresponding to each server node in the system. The setting of a particular bit will govern whether the corresponding server node is included in the access. Finally, each access component message will include the actual request 110, which can be a read, write or any other component message of an atomic multicast message.

Figure 2A:
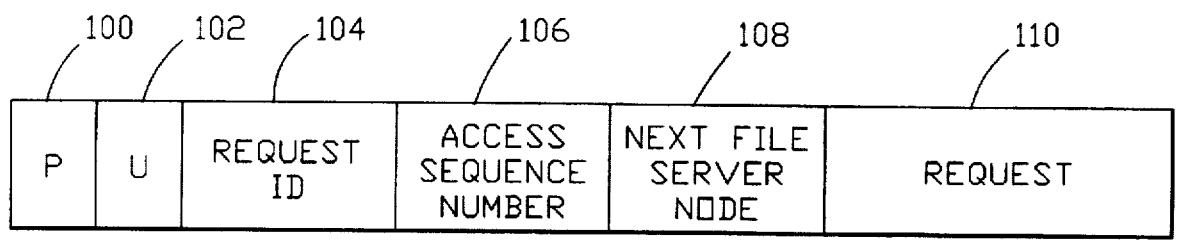
FIG. 2a shows the contents of a request message sent by a requesting site in one embodiment of the invention.
Figure 2B:
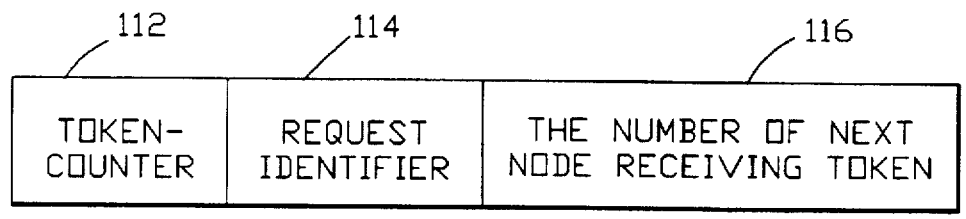
FIG. 2b shows the contents of a token passed between server nodes in one embodiment of the invention.

In accordance with one aspect of the invention, a token will be generated by the primary node in response to receiving the primary access component message. The contents of the token are shown in FIG. 2b. The token includes a token counter 112, which in a preferred implementation will have been assigned by the node that sent the token to the current node. The token counter value will be equal to the token-out counter value of the sending node. The token-out counter will be discussed in detail below.

The token also includes a request identifier 114. The request identifier identifies the request with which the token is associated. For instance, the token might be associated with the second request sent by a particular client node.

Finally, the counter includes an identifier 116 for identifying the next node to receive the token. This identifier can be a bit map, the set of bits which identify all nodes that are scheduled to receive the token. Alternatively, it could be a list of nodes. The bit map or list would be sent in the request message to the primary node of the request, and then relayed in the token.

The token is generated by the primary node and relayed from the primary node to the next subsequently higher numbered file server node, whether or not that higher-numbered node forms part of the request (i.e., regardless of whether the node receives an access component message for this access). The receiving node, in turn, forwards the token to the next node until the token finally reaches the ultimate node. Execution of the request portion of the access component message at a particular file server node cannot be initiated until the token corresponding to that request has been received, and until tokens for all prior requests have been received and their corresponding access components executed or initiated.

Figure 3:
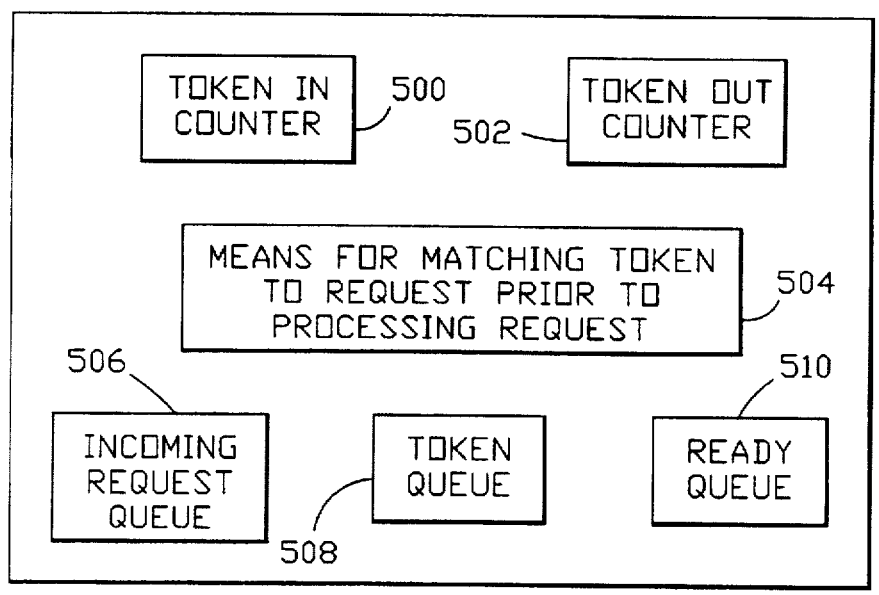
FIG. 3 is a functional block diagram of a server node useful in one embodiment of the invention.

The server nodes in the system of the present invention will now be described with reference to FIG. 3. The server nodes each include the following features, each implemented as software running on a general purpose computer: token in-counter 500; token out-counter 502; means 504 for matching a token to a request prior to processing the request; incoming request queue 506; token queue 508; and ready queue 510. The token in-counter and the token out-counter of each node is initialized to 0 at system startup. The function of the token in- and out-counters is to keep track of the number of tokens received and transmitted by that node. When a node receives a token, it increments its in-counter, and just after it sends a token, it increments its out-counter. The difference between the token in- and out-counters for a node represents the number of access component messages that a node has received but has not yet handled plus the number of ultimate requests that node has handled minus the number of primary requests.

The token queue 508 and incoming request queue 506 store tokens and requests, respectively, after they are received by a node, and until the request is scheduled to be processed. The ready queue stores the requests, in order, as they are determined by means 504 to be ready for processing. Once a request is stored in the ready queue, the corresponding entries in queues 506 and 508 will be deleted.

The token passing mechanism of the present invention works as follows. A node p receiving a primary access component message will generate and send a token associated with that message along to node (p+1) mod N with the current out token value. During generation of the token, node p will determine which succeeding node will receive an access component message and enter that information into field 116 of FIG. 2b. Alternatively, the entire bit map or list will be inserted in field 116. After passing the token along, node p then services the received access component and increments its out-counter.

When a subsequent file server node q receives the token message, it first checks its token in-counter 500. If the token counter 112 of the incoming token is less than (in-counter), then a lower numbered token (i.e., lower than token counter 112) must be received by the current node q before it processes the request associated with the just received token. It must be the case, in such an instance, that the network has reordered messages. If this is the case, the token is placed in node q's token queue 508 and is arranged by token-counter value and held until all intervening tokens have been received and processed.

Once the token in-counter 500 value reaches that of the token-counter 112 of a received token (now referred to as the "current token"), the node increments its in-counter (making its value consistent with the sending node's out-counter— thus, the token in-counter 500 is not incremented until a token is actually matched with the current in-counter value), and one of two different courses of action will be taken. The node checks if it is the next node to receive an access component message for this access by comparing its own node number to field 116 in the token message (or to the corresponding bit map position, as appropriate). If it is not the next node scheduled to receive an access component, it immediately replaces field 112 of the token with its current out-counter value and relays the token message to node (q+1) mod N. It then increments its out-counter. If, however, the node receiving the token message is the next node to receive an access component message for this access, the server node allows the request associated with the token to be serviced (i.e., performs the action requested in field 110 of the access component message). If the specified access component message has already arrived and has been previously stored in the incoming request queue 506, it can be moved to the ready queue and serviced at the next available opportunity. If the specified access component has not arrived, other access components with higher token-counter 112 values are not serviced until the specified access component message for the current token has arrived and been serviced. It is not necessary to delay servicing any primary access components at this time, if one is received at this node; primary access component requests can be processed immediately, generating a new token.

Note that in alternative embodiment of the invention, the token out-counter can be incremented prior to generating and sending the token. In such case, the token in-counter must be incremented before its associated request is processed or the token counter must match the token in-counter+1.

Once the access component message corresponding to the current token has arrived, the out-counter value is placed in the token-counter 112 of the current token. The out-counter is then incremented. Also, the received access component message will contain the number of the next higher numbered node to receive an access component message. Alternatively, a bit map or list is used to mark the servers that will receive access component messages. This value is written into field 116 of the current token. The request identifier will be written into field 114. The assembled token is then sent to the next (modulo N) file server node. The access component can then be serviced at the current node. If a bit map or list is used, then the token can be relayed to the next server immediately when it matches the in-counter value.

If the incoming access component message is marked as an ultimate access component, or if the last node in the bit map or list has been reached, no token is forwarded to any other node, and the protocol terminates at this node. The out-counter value of this node is not incremented. Processing of the request associated with the token otherwise proceeds as above.

So, there are two matchings that occur. First, an incoming token is matched with the current value of the in-counter. When this occurs, this token becomes the current token, and is held at the beginning of the token queue. Second, the current token is matched with an incoming request component message. Once this match has occurred, the incoming request component message can either be processed immediately, or can be placed at the end of a queue of scheduled request component messages, to be serviced by the parallel file system.

Note that requests that can be completely serviced by one server node will be contained in an access component message that is marked as both a primary and an ultimate access component. These accesses can be processed at any time by the receiving file server node, and have no effect on the in-counter or out-counter values of that node.

At some point, it may be that the in-counter and out-counter reach the maximum value that can be stored in an integer variable in those counters. When such is the case, it is necessary only to ensure that both counters are of the same size and become zero as a result of incrementing the maximum value that the counter can hold.

It should be noted that the tokens do not need a token counter if some other means for guaranteeing message ordering between two nodes can be effected, such as by the message passing system. In such an implementation, the tokens would resemble those of FIG. 2, except no token counter would be present.

It is also notable that at each file server node that will receive an access component message, if a bit map or list is not used to specify what servers will receive access component messages, it is necessary to receive the corresponding access component message before the token can be forwarded to the next file server node. This is necessary because the incoming access component message contains the information of which is the next higher file server node that will receive an access component message. If the token has a bit map or a list, this is not necessary. The information is necessary so that when a file server node receives a token, it can know whether it will be required to service a component of this access, or if it can proceed to service access components that are designated by higher numbered tokens. Sending the number of the next higher node that will receive an access component message in each access component message avoids the need to send in the primary access component message a list of possibly hundreds or thousands of file server nodes that will receive an access component message. However, this does introduce a possible delay in the relay of the token to all file server nodes involved in an access. In the case where one access component message is delayed, execution of the access components at all subsequent file server nodes will be delayed by an equal or greater time.

An alternative embodiment of the invention solves this problem. The solution is to provide enough information in the primary access component message to identify all subsequent file server nodes that can expect to receive an access component for this access. As mentioned, this information could be provided in a list, but this solution is not scalable to a very large number of file server nodes. Still another is use of a bit map, described earlier.

Also, it may be possible in some applications to describe the server nodes to be used by means of a set of parameters. If the incoming token or the primary access component message contains enough information to identify all the file server nodes that will receive access component messages, then the token can be immediately passed by each node to the next node without waiting for the incoming access component message to arrive. Also, it is no longer necessary to distinguish the ultimate access component message from other access component messages (because if a node is, in fact, the ultimate node, there will be no next node for receiving the token). Note that there may be some skew inherent in the sending of access component messages from the requesting to each file server node servicing an access, so it may be that the token can be relayed to each file server node before it receives its access component message.

One simple case where the primary access component message can contain a parameter that determines what other file server nodes will receive access component messages is the case where all requests span a contiguous (modulo N) range of file server nodes. In this case, either a count of the number of nodes spanned or the number of the last node spanned is sufficient to define all the nodes to receive access component messages.

In accordance with the invention, the protocol can be adapted to prevent the reordering of asynchronous requests from a single client in a multi-client, multi-server system. Such is the case where a client sends a first set of access component messages to the pertinent nodes representing a first access, and, before the first request has been fully processed, sending a second set of access component messages, representing a second access.

Such asynchronous requests are prevented from being reordered by requiring the ultimate node of a request to return an acknowledgement message to the requesting client upon completion of the circulation of the token for that request. The client node, in turn, is prevented from issuing a second request until it has received an acknowledgement message from the preceding request. The acknowledgement message can be received before the request has been executed. Receiving the acknowledgement message indicates that the request has been scheduled.

The invention has performance advantages over two-phase commit protocols that require several messages to be passed between the requesting site and the file server nodes. It requires the minimum or close to the minimum number of messages to be passed among the file server nodes. The invention does not rely on globally synchronized system clocks to order the accesses as is done in some other schemes. The invention is simple to implement on a message passing computer.

An enhancement to the invention allows multiple request components to be sent to each server node. In this case, the token will still contain information denoting which subset of server nodes will receive requests. However, each request component sent to each server node will have an additional field containing the total number of request components to be sent to that node. When the token is first matched with any of these request components, this number is recorded. The token is then held at the front of the token queue until it has been matched with that number of request components of that request.

In the present invention, cycles are not allowed. A cycle would be a set of tokens where the paths of the tokens taken together reached each server node, and where at least one token was passed between each pair of server nodes. To break cycles, it is necessary to define a pair of server nodes between which no token may be passed. To ensure atomic ordering of all accesses to the file system, it is simplest to require that no token be passed between node N−1 and node 0. Tokens that would have crossed this boundary are instead started at node 0, and relayed through to node N−1.

This condition can be relaxed if it is only necessary to ensure atomicity of accesses at the file level. In this case, for each file, a boundary can be defined between one pair of server nodes, through which no token related to a request to that file would be relayed. To implement the protocol properly to ensure atomicity at the file level only, for each file there would have to be maintained a token-in and token-out counter at each node that a component of the file resided on, and these counters would be incremented only when a token relating to an access to that file was processed. Note that maintaining ordering of accesses at the system level implies that accesses are ordered at the file level.

An intermediate solution is to maintain a set of in-counters and out-counters at each server node, and to assign each file to one of the set of counters at each node, consistently choosing the same counters at each node. For example, an array of in-counters and an array of out-counters can be kept at each node, and some fixed attribute of the file, such as its name, can be hashed to an array index to consistently select an in-counter and out-counter to use from the set at each node. In effect, multiple sets of counters are defined across all the servers, and each file is assigned to one of the sets of counters for the purpose of the protocol. Note that in this case, a different boundary can be set for each set of counters through which boundary no token relating to a file assigned to that set of counters can pass.

Also, note that to break cycles the boundary through which tokens may not cross can be set at the highest level of granularity for which atomicity is required. If all accesses must be atomic with respect to each other, then a single set of token counters must be used, with a single boundary through which no token may pass. If atomicity is only required at the file level, then as long as a boundary is set for each file through which no token related to that file may pass, then atomicity is maintained at the file level, even if a single set of token in and out counters is used, or if the file is assigned to one of a set of token in and out counters. The boundary can be set arbitrarily and independently for each file.

In some cases, the token may be able to carry enough information to obviate the need for all but the primary request message. In this case, the actions described by the token can be performed or inserted into the scheduled request queue as soon as the token matches the token in-counter, without waiting for the token to be matched with one or more incoming request component messages. The protocol ensures that such requests are processed atomically with respect to all other requests, whether or not they require separate request component messages to be sent.

For example, in a parallel file system, read and write requests may require separate request component messages to be sent to each file server node which will service a component of the request. However, operations such as create and delete of a file can be described by a single request message from the client, and can be performed at each node by annotating the token for that request with the information that would otherwise be contained in the request component messages, since very little information is required.

While the invention has been described in particular with respect to preferred embodiments thereof, it will be understood that modifications to the disclosed embodiments can be effected without departing from the spirit and scope of the invention.

We claim:

1. A method for achieving atomic multicasting in a computer having a plurality of system nodes, comprising:

sending a first message from a first node to a first plurality of nodes that will receive the multicast message;

in a logical first of the first plurality of nodes that receive the message:

generating a token;

delivering the first message to an application; and passing the token to a next system node;

in each node that is not the logical first of the first plurality of nodes that receive the message, delivering the first message to the application after such node has received the token, and if it is not the logical last of the first plurality of nodes, passing the token to a next system node.

2. The method of claim 1, wherein the next system node is a next sequential node in a canonical ordering of the system nodes.

3. The method of claim 2, wherein the first plurality of nodes is a subset of the plurality of system nodes.

4. The method of claim 1, wherein the system is a client-server system, and wherein the first node is a client node and the first plurality of nodes are server nodes.

5. The method of claim 1, wherein the multicast message is a service request from a client to a plurality of server nodes.

6. A method for processing data accesses of a plurality of system servers in a parallel computer file system, comprising:

sending a first data request from a first requesting client to a first plurality of servers storing data to be accessed;

in a logical first of the plurality of servers storing the data to be accessed, generating a token, processing the first request and sending the token to a logically adjacent server;

in each server that is not the logical first of the plurality of servers storing the data to be accessed, processing the first request after such server has received the token, and if it is not the logical last of the plurality of servers storing data to be accessed, passing the token to a logically adjacent server.

7. The method of claim 6, wherein a logically adjacent server is defined as a next sequential server in a canonical ordering of the plurality of system servers.

8. The method of claim 6, further comprising:

sending a second data request from a second requesting client to a second plurality of servers storing data to be accessed;

in a logical first of the second plurality of servers storing the data to be accessed, generating a second token, processing the second request and sending the second token to a logically adjacent server;

in each server that is not the logical first of the second plurality of servers storing the data to be accessed, processing the second request only after such server has both received the second token and processed all prior requests, and if it is not the logical last of the second plurality of servers storing data to be accessed, passing the token to a logically adjacent server.

9. The method of claim 8, wherein the first plurality of servers and the second plurality of servers have one or more servers in common.

10. The method of claim 9, wherein the first and second data requests have one or more data in common.

11. The method of claim 9, wherein the data to be accessed by the first and second requests are identical.

12. The method of claim 8, wherein the first and second clients are the same client.

13. The method of claim 8, wherein the first and second clients are different clients.

14. The method of claim 6, wherein the first data request comprises an access component message sent to each server storing data to be accessed, the access component message containing a data request message and an identification of a next subsequent server in the plurality of servers receiving an access component message as part of the first data request.

15. The method of claim 14, wherein the first data request message further comprises an identification of the first requesting client and an access sequence number.

16. The method of claim 14, wherein the first data request message further comprises an indication of whether the server receiving it is the logical first of the plurality of servers storing data to be accessed as part of the first request, or the logical last of the plurality of servers.

17. The method of claim 6, wherein each token comprises a token counter representing the number of tokens passed by a preceding server, a request identifier identifying the request with which the token is associated, and the address of the next server to receive a request message.

18. The method of claim 17, wherein the step of processing the second request only after such server has both received the second token and processed all previous requests, comprises:

receiving a token;

storing the token in a token queue;

comparing the token with a token in-counter;

incrementing the token in-counter when the token matches the token in-counter;

comparing the request identifier of the token with the request identifier of the received requests;

when the token matches one of the received requests, relaying the token to the next node, incrementing the token out-counter and performing the request.

19. The method of claim 18, further comprising maintaining a count in each server of the number of tokens sent by that server.

20. The method of claim 18, wherein the step of passing the token to another server comprises writing in the token the address of the server to the next server to receive a request component, sending the token to that address and incrementing the count of the number of tokens sent by the sending server.

21. The method of claim 6, wherein the first access component message identifies each server in the plurality of servers that will receive the first data request.

22. The method of claim 21, wherein the first access component message identifies each server that will receive the first data request by means of a list of such servers.

23. The method of claim 21, wherein the first access component message identifies each server that will receive the first data request by providing an identifier of a predetermined configuration of servers.

24. The method of claim 21, wherein the first access component message identifies each server that will receive the first data request by providing a bit map in which each bit corresponds to a server in a system of servers.

25. The method of claim 7, wherein the logical last server sends an acknowledgement message to the client after matching the first access request to a token, and wherein the client is prevented from sending the second access request until it has received the acknowledgement message.

26. The method of claim 6, wherein the request from the first requesting client comprises a plurality of access component messages sent to each of the first plurality of servers.

27. The method of claim 18, wherein the request from the first requesting client comprises a plurality of access component messages sent to each of the first plurality of servers.

28. The method of claim 27, wherein each access component message contains a field specifying the total number of access component messages of that request that are destined for that node, and wherein the token is held at that node until it is successfully matched with that number of access component messages.

29. The method of claim 6, further comprising:

sending a second data request from a second requesting client to one server of a second plurality of servers storing data to be accessed;

generating a second token in the one server of the second plurality, processing the second request and sending the second token to a logically adjacent of the second plurality of servers;

in each of the other servers in the second plurality of servers, processing the second request after such server has received the second token, and if it is not the logical last of the second plurality of servers, passing the token to a logically adjacent of the plurality of servers.

30. A method for processing data accesses of a plurality of servers in a parallel computing system, comprising:

sending a first data request from a first requesting client to one server of a plurality of servers storing data to be accessed;

generating a token in the one server, processing the first request and sending the token to a logically adjacent of the plurality of servers;

in each of the other servers in the first plurality of servers storing the data to be accessed, processing the first request after such server has received the token, and if it is not the logical last of the plurality of servers storing data to be accessed, passing the token a logically adjacent of the plurality of servers.

31. The method of claim 30, further comprising:

sending a second data request from a second requesting client to one of a second plurality of servers storing data to be accessed;

generating a second token in the one server of the second plurality, processing the second request and sending the second token to another of the plurality of servers;

in each of the other servers in the second plurality of servers storing the data to be accessed, processing the second request only after such server has both received the second token and processed all prior requests, and if such server is not the logical last of the second plurality of servers storing data to be accessed, passing the token to a logically adjacent server.

32. The method of claim 31, further comprising designating a pair of servers between which no token can pass.

33. A system for achieving atomic multicasting in a computer having a plurality of system nodes, comprising:

means for sending a first message from a first node to a first plurality of nodes that will receive the multicast message;

means in a logical first of the first plurality of nodes that receive the multicast message:

for generating a token;

for delivering the first message to an application; and for passing the token to a next system node;

means in each node that is not the logical first of the first plurality of nodes that receive the message, for delivering the first message to the application after such node has received the token, and if it is not the logical last of the first plurality of nodes, for passing the token to a next system node.

* * * * *